(12) United States Patent
Kim

(10) Patent No.: US 7,166,690 B2
(45) Date of Patent: Jan. 23, 2007

(54) RECYCLED METHOD FOR A WASTED POLYESTER AND RECLAIMED MATERIALS THEREOF

(75) Inventor: Do-Gyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/498,920

(22) PCT Filed: Dec. 14, 2002

(86) PCT No.: PCT/KR02/02359

§ 371 (c)(1),
(2), (4) Date: Feb. 18, 2005

(87) PCT Pub. No.: WO03/051956

PCT Pub. Date: Jun. 26, 2003

(65) Prior Publication Data

US 2005/0203277 A1    Sep. 15, 2005

(30) Foreign Application Priority Data

Dec. 15, 2001  (KR) .................. 10-2001-0079879
Dec. 15, 2001  (KR) .................. 10-2001-0079882
Dec. 27, 2001  (KR) .................. 10-2001-0086441
Dec. 27, 2001  (KR) .................. 10-2001-0086442

(51) Int. Cl.
*C08F 6/00* (2006.01)

(52) U.S. Cl. .................. 528/480; 521/40; 521/48; 528/176; 528/192; 528/193; 528/194; 528/271; 528/272

(58) Field of Classification Search .................. 521/40, 521/48; 528/176, 192, 193, 194, 271, 272, 528/480
See application file for complete search history.

(56) References Cited

U.S. PATENT DOCUMENTS

| 3,751,435 | A | * | 8/1973 | van der Ven et al. | ....... 549/328 |
| 5,414,107 | A | * | 5/1995 | Smith | ........... 560/79 |
| 5,635,584 | A | | 6/1997 | Ekart et al. | ........... 528/271 |
| 6,803,389 | B1 | * | 10/2004 | Kawamura et al. | ........... 521/48 |

FOREIGN PATENT DOCUMENTS

| JP | 08-253596 | | 10/1996 |
| JP | 11-228733 | * | 8/1999 |
| JP | 2001-066436 | | 3/2001 |
| KR | 2002-0018220 | | 3/2002 |

* cited by examiner

*Primary Examiner*—Terressa Boykin
(74) *Attorney, Agent, or Firm*—Roylance,Abrams,Berdo & Goodman, L.L.P.

(57) ABSTRACT

The present invention relates to a method for the recycling waste polyester resins and the reclaimed materials therefrom. The method for recycling waste polyester resins according to one embodiment the present invention comprises (a) depolymerizing waste polyester resin; (b) polycondensing the depolymerized product from step (a) with a polyhydric alcohol to provide a polyester polymer having an acid value of 10–150 mgKOH/g; and (c) recovering the polyester polymer in solid or liquid form if the polyester polymer from step (b) has an acid value of more than 20 mgKOH/g or recovering the polyester polymer in solid form if the polyester polymer from step (b) has an acid value of less than 20 mgkOH/g. The reclaimed polyester resin according to the present invention has the excellent compatibility, dispersibility, and adhesive property for various media, and can be used easily neutralized and dissolved in water. Accordingly, the polyester resin can be used as a useful material for industrial products.

35 Claims, 4 Drawing Sheets

RECYCLED METHOD FOR A WASTED POLYESTER AND RECLAIMED MATERIALS THEREOF

TECHNICAL FIELD

Then present invention relates to a method for recycling waste polyester resins and the reclaimed materials therefrom, and more particularly, to a recycling method for making liquid or solid polyester resin compositions with excellent compatibility, solubility and dispersibility by depolymerizing and polycondensing crushed waste polyester resins and the reclaimed materials therefrom.

BACKGROUND ART

Polyester resins such as polyethylene terephthalate(hereinafter referred to as "PET") have good heat resistance, processability and transparency, and non-toxicity compared with other materials, and, therefore are widely used for daily products and industrial supplies. Accordingly, a demand for polyester resins and production of that is increasing continuously and the polyester resin wastes also increase. As a result, environmental problems are looming large, concerning the treatment of these wastes. These polyester resin wastes are specified as recyclable in Korean Wastes Control Act but only a little amount of them is recycled, because the technological level of recycling method is merely to remelt physically the waste polyester resins, and make products and the quality of the reclaimed products is not satisfactory. Thus, treatment of the waste polyester resins becomes a serious problem, and methods for solving this problem are required desperately.

DISCLOSURE OF INVENTION

Accordingly, the present invention is directed to a method for recycling waste polyester resins and reclaimed materials therefrom that substantially obviates one or more problems due to limitations and disadvantages of the related art.

An object of the present invention is to provide a recycling method for making liquid or solid polyester resins with excellent compatibility, solubility and dispersibility by means of depolymerization and polycondensation of waste polyester resins.

To achieve the object and in accordance with the purpose of the invention, as embodied and broadly described herein, there is provided a method for recycling waste polyester resins by depolymerizing and polycondensing waste polyester resins. The method for recycling waste polyester resins comprises:

(a) depolymerizing waste polyester resin;

(b) polycondensing the depolymerized product from step (a) with a polyhydric alcohol to provide a polyester polymer having an acid value of 10–150 mg KOH/g; and (c) recovering the polyester polymer in solid or liquid form if the polyester polymer from step (b) has an acid value of more than 20 mg KOH/g or recovering the polyester polymer in solid form if the polyester polymer from step (b) has an acid value of less than 20 mg KOH/g.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

Reference will now be made in detail to the preferred embodiments of the present invention, examples of which are illustrated in the accompanying drawings.

Figure 1:
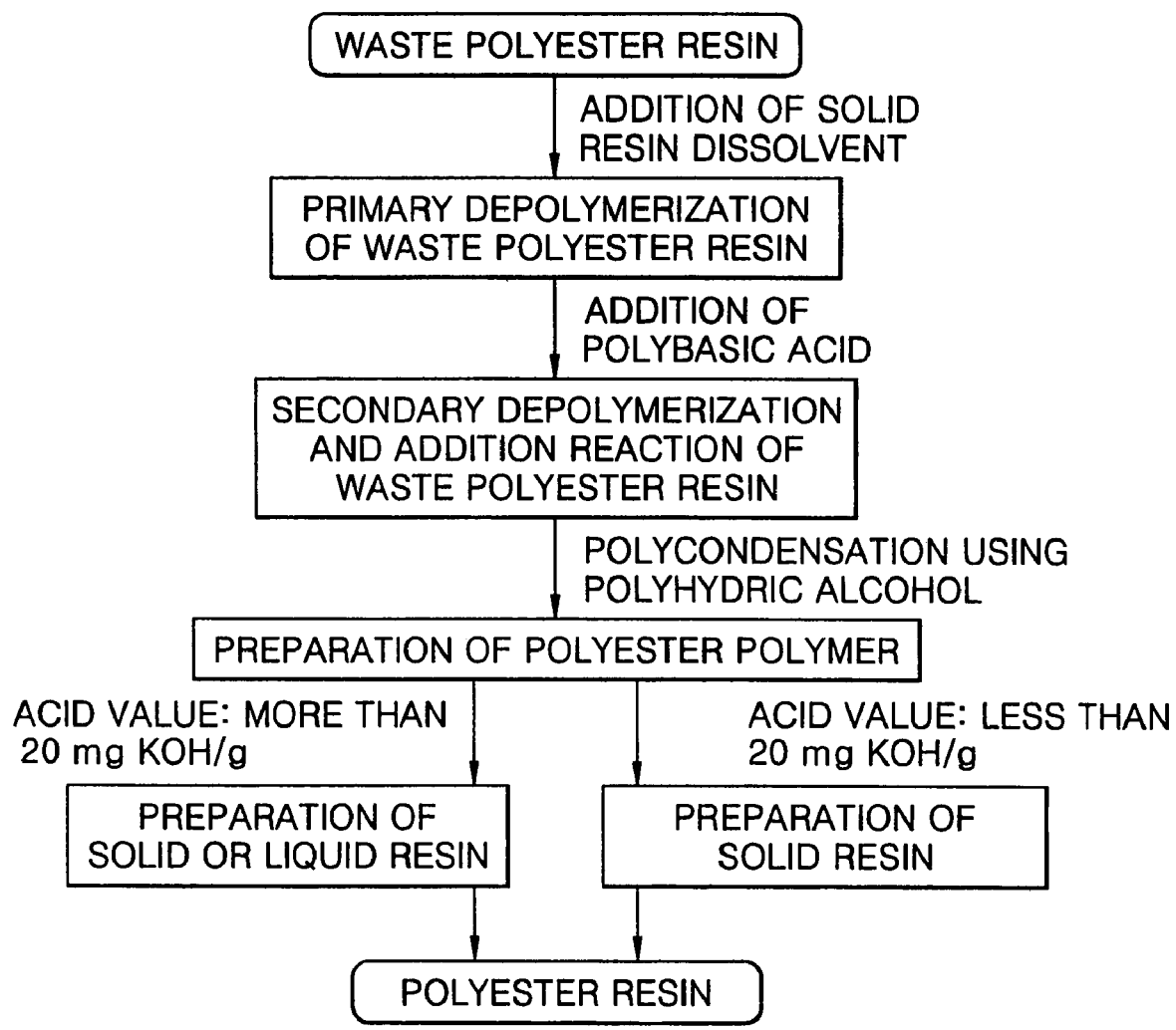
FIG. 1 is a flow chart of a method for recycling waste polyester resins in accordance with the present invention.

FIG. 1 is a flow chart of a method for recycling waste polyester resins in accordance with the present invention. As shown in FIG. 1, the composition of a reclaimed polyester resin in accordance with the present invention is produced through the steps comprising:

(a) depolymerizing waste polyester resin;

(b) polycondensing the depolymerized product from step (a) with a polyhydric alcohol to provide a polyester polymer having an acid value of 10–150 mg KOH/g; and (c) recovering the polyester polymer in solid or liquid form if the polyester polymer from step (b) has an acid value of more than 20 mg KOH/g or recovering the polyester polymer in solid form if the polyester polymer from step (b) has an acid value of less than 20 mg KOH/g.

The step (a) further comprises:

(a1) reacting the waste polyester resin with a solid resin dissolvent for primary depolymerization; and (a2) reacting the depolymerized product from step (a1) with a polybasic acid for secondary depolymerization and an addition reaction.

As the solid resin dissolvent to be used in the primary depolymerization of step (a), one or more dissolvent can be selected from the group of gum rosin, wood rosin, dehydrogenated rosin, hydrogenated rosin, maleic rosin, rosin ester, pinene resin, dipentene resin, C5 petroleum resins, C9 petroleum resins, dammar resin, copal resin, dicyclopentadiene(hereinafter referred to as "DCPD") resin, hydrogenated DCPD resin, and styrene maleic resin. The weight ratio of waste polyester resins to the solid resin dissolvent is 1:9–9:1. In addition, as the polybasic acid to be used in the secondary depolymerization of step (a), one or more acids can be selected from the group of phthalic anhydride, isophthalic acid, terephthalic acid, adipic acid, azelaic acid, sebacic acid, tetrahydrophthalic anhydride, maleic anhydride, fumaric acid, itaconic acid, trimellitic acid, trimellitic anhydride, pyromellitic anhydride, succinic acid, cyclohexane dicarboxylic acid, naphthalene dicarboxylic acid, and benzoic acid. The amount of polybasic acid to be used is 10–70% by weight of the weight of the depolymerized product from step (a1).

In the step (b), there is produced a polyester polymer having an acid value range of 10 to 150 mg KOH/g by polycondensing the depolymerized product from step (a) with a polyhydric alcohol. The polyhydric alcohol, which adjust an acid value, to be used in the step (b) may be, for example, ethylene glycol, propylene glycol, 1,3-propanediol, 1,3-butanediol, 1,6-hexanediol, neopentyl glycol, diethylene glycol, dipropylene glycol, polyethylene glycol, alkylene oxide adduct of bisphenol A, trimethylol propane, glycerin, pentaerythritol, and a mixture thereof. The amount of the polyhydric alcohol to be used is 10~70% by weight of the depolymerized product from step (a). The polyester polymer obtained via the step (a) and the step (b) is a solid resin. The weight average molecular weight of the polyester polymer is 3,000–50,000 and the softening point is 70~150° C.

In the steps (a) and (b), the reactions are carried out in the presence of 0.05~0.5% by weight of the weight of depolymerization and polycondensation catalysts at 200~250° C.

The step (c) has two different steps, i.e., a step for recovering the polyester polymer in solid or liquid form if the polyester polymer from the step (b) has an acid value of more than 20 mg KOH/g, or a step for recovering the polyester polymer in solid form if the polyester polymer from the step (b) has an acid value of less than 20 mg KOH/g. The polyester polymer in liquid form is produced by reacting the polyester polymer from step (b) with a basic compound in order to obtain a neutralized polyester polymer and dissolving or dispersing the neutralized polyester polymer in water, a hydrophilic solvent, or a mixture thereof.

Here, as the basic compound to be used in the step (c) one or more compounds can be selected from the group of sodium hydroxide, potassium hydroxide, ammonium hydroxide, lithium hydroxide, and amines. The amount of the basic compound to be used is 3~30% by weight of the polyester polymer from the step (b). In addition, as the hydrophilic solvent, one or more solvents can be selected from the group of alcohols, ethers, acetone, diacetone alcohol, dimethyl formamide, tetrahydrofuran, ethylene glycol, propylene glycol, butylene, glycol, and N-methyl-2-pyrrolidone. The amount of the water, hydrophilic solvents, or a mixture of both of them to be added is 1~10 times the weight of the neutralized polyester polymer.

The resulted polyester resin is either a liquid or a solid state, and, when measured by means of a constant load capillary extrusion rheometer, the polyester resin has a flow beginning temperature $(T_{fb})$ of 80~105° C., a flow ending temperature $(T_{end})$ of 120~160° C., and a glass transition temperature $(T_g)$ of 40–80° C. Moreover, the polymer resin has excellent reactivity and dispersibility because it has two or three carboxyl groups at the end of a polymer chain. The present invention can produce said polyester resin through recycling waste polyester resins, and said raw materials may have various composition ratios.

The present invention will be described in further detail with reference to the examples thereof, which examples however are merely intended to be illustrative and not to be construed as limiting the scope of the invention.

EXAMPLE 1

The reclaimed polyester resin according to the present invention can be used as a toner binder for an electrophotograph and an electrostatic development.

The toner of the present invention is made of a polyester resin, a colorant, charge control agents and release agents by means of polymerization or crushing method. The colorant that can be selected is a black pigment such as carbon black and magnetite, a yellow pigment such as iron oxide yellow, hansa yellow and permanent yellow, a blue pigment such as phthalocyanine blue and violet, a red pigment such as iron oxide red, carmine, toluidine red and quinacridone red, and a green pigment such as phthalocyanine green and chrome green. The amount of the colorant to be added is 1~40 wt %. The charge control agents can be selected from the group of negrosin-based dyes and quaternary ammonium salts such as BONTRON N-07 and BONTRON N-21(available from Orient Chemical Co., Ltd. (Japan)) as a plus(+) charge control agent, and azo metal complex and salicylic acid metal complex such as BONTRON S-34) and BONTRON E-84(available from Orient Chemical Co., Ltd. (Japan)) as a minus(−) charge control agent. The amount of the charge control agent to be used is 0.5~5 wt % based on the amount of the binder resin. The release agent can be selected from the group of polyethylene wax, polypropylene wax, higher fatty acid esters, higher aliphatic alcohols., carnauba wax and montan wax. One or more release agents can be used. The amount of the release agent to be used is 0.5~10 wt % based on the amount of the binder resin. To obtain an excellent image, these additives have to be well dispersed in the binder resin. The reclaimed polyester resin of the present invention is well dispersed and dissolved in water, hydrophilic solvents or a mixture thereof, and, therefore, a toner can be produced from polymerization method by dispersing said additives in the liquid polyester resin according to the present invention. In addition, in case of using crushing method, said additives can be well dispersed in the solid polyester resin according to the present invention because the solid polyester resin has functional group to play a role of a surfactant, and, therefore, it is possible to produce a toner with a good performance. When measured by means of a rheometer, the toner from Example 1 has a flow beginning temperature$(T_{fb})$ of 80~95° C. and a flow ending temperature $(T_{end})$ of 120~135° C. Moreover, the toner forms rapidly a very clear image, and has desirable low temperature fixing and offset properties.

EXAMPLE 2

The reclaimed polyester resin according to the present invention can be used as a composition of powder coating, which uses epoxy resin as a hardener. The polyester resin composition of the present invention has excellent reactivity and dispersibility because it has two or three carboxyl groups at the end of polymer chains, and, therefore, by adding a little amount of anti-blocking agent to the polyester resin it can maintain good storage stability. In addition, because the polyester is resin with a low softening temperature, the hardening reaction is carried out in about ten minutes at less than 180° C. As a result, it is possible to lower the hardening temperature and to obtain high quality film of paint that has high gloss and excellent heat resistance and chemical resistance.

EXAMPLE 3

The reclaimed polyester resin according to the present invention can be used as a composition for oil modified alkyd varnish coatings and printing inks. The solid polyester resin of the present invention reacts with fatty acid and drying oil, and the product therefrom can dissolve well in aliphatic hydrocarbon solvents or aromatic hydrocarbon solvents, thereby providing a stable film of paint having excellent gloss, water resistance and weatherability, and a high quality image. In gravure inks, the polyester resin of the present invention can provide a good printing image with high speed drying and excellent adhesive property, abrasion resistance and ruggedness, because it dissolves well in mixture solvents of ketone solvents and aromatic hydrocarbon solvents.

EXAMPLE 4

The reclaimed polyester resin according to the present invention can be used as a composition of an adhesive. The polyester resin of the present invention, which is used as a basic adhesive resin in a hotmelt adhesive, has a low softening temperature, a low melt viscosity, and excellent adhesive property, water resistance, chemical resistance, and compatibility. The hotmelt adhesive made of the polyester resin of the present invention provides excellent initial adhesive property and strong adhesive force for paper, boards, leathers, fabrics, woods, plastics and metals such as aluminum. These adhesives can also be used as liquid adhesives through dissolving them in various solvents.

The said Examples will be described in further detail by referring to preparation examples, which examples however are merely intended to be illustrative and not to be construed as limiting the scope of the invention.

PREPARATION EXAMPLE 1

Crushed waste PET chips (400 g), gum rosin (200 g) and monobutyl stannoic acid (0.3 g) are placed in a reactor which is equipped with an agitator, a reflux condenser, a separator, a thermometer and a nitrogen injection port. The mixture is heated to 250° C. and maintained over 2 hours at that temperature. The mixture is agitated when the waste PET chips begin to be melted. After the mixture changes into a transparent state, the reactor is cooled to 150° C., and then, maleic anhydride (180 g) is added to the reactor. When the temperature of the mixture reaches to the point that ring-opening reaction is finished, the mixture is again heated to 235° C. and maintained over 3 hours at that temperature for a depolymerization reaction. The acid value of the depolymerization product is 115 mg KOH/g. Then, the reactor is charged with 200 grams of ethylene oxide adduct of bisphenol A. The reactor is heated to 250° C. and maintained over 5 hours at that temperature, and a polycondensation accompanied with a dehydration reaction is carried out. When the acid value reaches to 55 mg KOH/g, the reactor is cooled and charged with 50 grams of sodium hydroxide and 1,500 grams of per distilled water. Then, the mixture is stirred over 30 minutes at 85° C. The resultant water-soluble polyester resin has an acid value of 39 mg KOH/g, a weight average molecular weight of 11,000, a softening point of 80° C. and pH of 8.5.

Said water-soluble polyester resin can be used as a polymerization toner binder as follows. There are prepared the water-soluble polyester resin (100 g), carbon black(3 g), charge control agents(0.1 g), and release agents(1 g). These reactants are mixed and dispersed, thereby making suspended particles. The suspended particles are filtrated, washed by water, and dried to form a toner composition. Then, the dried toner composition (100 g) is mixed with external additives (1 g), to produce a toner. A toner cartridge filled with said toner can provide a very clear developed image. The toner produced from the reclaimed polyester resin according to the present invention has excellent physical properties and a fusing property.

PREPARATION EXAMPLE 2

Crushed waste PET chips (400 g), hydrogenated rosin (200 g), monobutyl tartaric acid (0.3 g), trimellitic anhydride (150 g) and neopentyl glycol (200 g) are placed in a reactor which is equipped with an agitator, a reflux condenser, a separator, a thermometer and a nitrogen injection port. The reaction method is the same with Preparation Example 1. The resultant water-soluble polyester resin has an acid value of 30 mg KOH/g, a weight average molecular weight of 12,000, a softening point of 95° C. and pH of 8.7.

Said water-soluble polyester resin can be used as a polymerization toner binder as follows. There are prepared the water-soluble polyester resin (100 g), carbon black (3 g), charge control agents (0.1 g), and release agents (1 g ). These reactants are mixed and dispersed, thereby making suspended particles. The suspended particles are filtrated, washed by water, and dried to form a toner composition. Then, the dried toner composition (100 g) is mixed with external additives (1 g ) to produce a toner. A toner cartridge filled with said toner can provide a very clear developed image. The toner produced from the reclaimed polyester resin according to the present invention has excellent physical properties and a fusing property.

PREPARATION EXAMPLE 3

Crushed waste PET chips (400 g), rosin ester (200 g), monobutyl stannoic acid (0.3 g), fumaric acid (150 g), neopentyl glycol (100 g) and diethylene glycol (100 g) are placed in a reactor which is equipped with an agitator, a reflux condenser, a separator, a thermometer and a nitrogen injection port. The reaction method is the same with Preparation Example 1, except that potassium hydroxide (55 g) is used as a neutralizer instead of sodium hydroxide. The resultant water-soluble polyester resin has an acid value of 28 mg KOH/g, a weight average molecular weight of 12,000, a softening point of 105° C., and pH of 8.1.

PREPARATION EXAMPLE 4

Crushed waste PET chips (400 g), C5 petroleum resins (200 g), monobutyl stannoic acid (0.3 g), trimellitic anhydride (150 g), ethylene glycol (100 g) and trimethylol propane (80 g) are placed in a reactor which is equipped with an agitator, a reflux condenser, a separator, a thermometer and a nitrogen injection port. The reaction method is the same with Preparation Example 1, except that ammonium hydroxide (50 g) is used as a neutralizer instead of sodium hydroxide, and butylene glycol (200 g) as a hydrophilic solvent instead of distilled water. The resultant water-soluble polyester resin has an acid value of 30 mg KOH/g, a weight average molecular weight of 13,000, a softening point of 108° C., and pH of 7.9.

PREPARATION EXAMPLE 5

Crushed waste PET chips (400 g), C9 petroleum resins (200 g), monobutyl stannoic acid (0.3 g), adipic acid (50 g), maleic anhydride (100 g), propylene glycol (100 g) and neopentyl glycol (100 g) are placed in a reactor which is equipped with an agitator, a reflux condenser, a separator, a thermometer and a nitrogen injection port. The reaction method is the same with Preparation Example 1, except that sodium hydroxide (30 g) and trimethylamine (35 g) are used as a neutralizer instead of sodium hydroxide. The resultant water-soluble polyester resin has an acid- value of 31 mg KOH/g, a weight average molecular weight of 13,000, and pH of 7.7.

PREPARATION EXAMPLE 6

Crushed waste PET chips (350 g), maleic gum rosin (250 g), monobutyl stannoic acid (0.3 g), trimellitic anhydride (100 g), neopentyl glycol (50 g), and ethylene oxide adduct of bisphenol A (150 g) are placed in a reactor which is equipped with an agitator, a reflux condenser, a separator, a thermometer and a nitrogen injection port. The reaction method is the same with Preparation Example 1. The resultant water-soluble polyester resin has an acid value of 45 mg KOH/g, a weight average molecular weight of 11,500, a softening point of 81° C., and pH of 8.7.

PREPARATION EXAMPLE 7

Crushed waste PET chips (350 g), DCPD resin (250 g), monobutyl stannoic acid (0.3 g), maleic anhydride (150 g), neopentyl glycol (100 g) and polyethylene glycol (100 g) are placed in a reactor which is equipped with an agitator, a reflux condenser, a separator, a thermometer and a nitrogen injection port. The reaction method is the same with Preparation Example 1, except that ammonium hydroxide (030 g) and trimethylamine (50 g) is used as a neutralizer instead of sodium hydroxide. The resultant water-soluble polyester resin has an acid value of 30 mg KOH/g, a weight average molecular weight of 12,000, a softening point of 95° C., and pH of 8.1.

PREPARATION EXAMPLE 8

Crushed waste PET chips (400 g), DCPD resin (200 g), monobutyl stannoic acid (0.3 g), isophthalic acid (100 g), adipic acid (50 g), neopentyl glycol (70 g) and ethylene oxide adduct of bisphenol A (120 g) are placed in a reactor which is equipped with an agitator, a reflux condenser, a separator, a thermometer and a nitrogen injection port. The reaction method is the same with Preparation Example 1, except that neutralizing and solubilizing processes are skipped. The resultant solid polyester resin has an acid value of 10 mg KOH/g, a weight average molecular weight of 20,000, and a softening point of 93° C.

PREPARATION EXAMPLE 9

Crushed waste PET chips (500 g), gum rosin (200 g), monobutyl stannoic acid(0.3 g), maleic anhydride(100 g) and pentaerythritol(200 g) are placed in a reactor which is equipped with an agitator, a reflux condenser, a separator, a thermometer and a nitrogen injection port. The reaction method is the same with Preparation Example 1, except that neutralizing and solubilizing processes are skipped. The resultant solid polyester resin has an acid value of 11 mg KOH/g, a weight average molecular weight of 30,000, and a softening point of 145° C.

Figure 2:
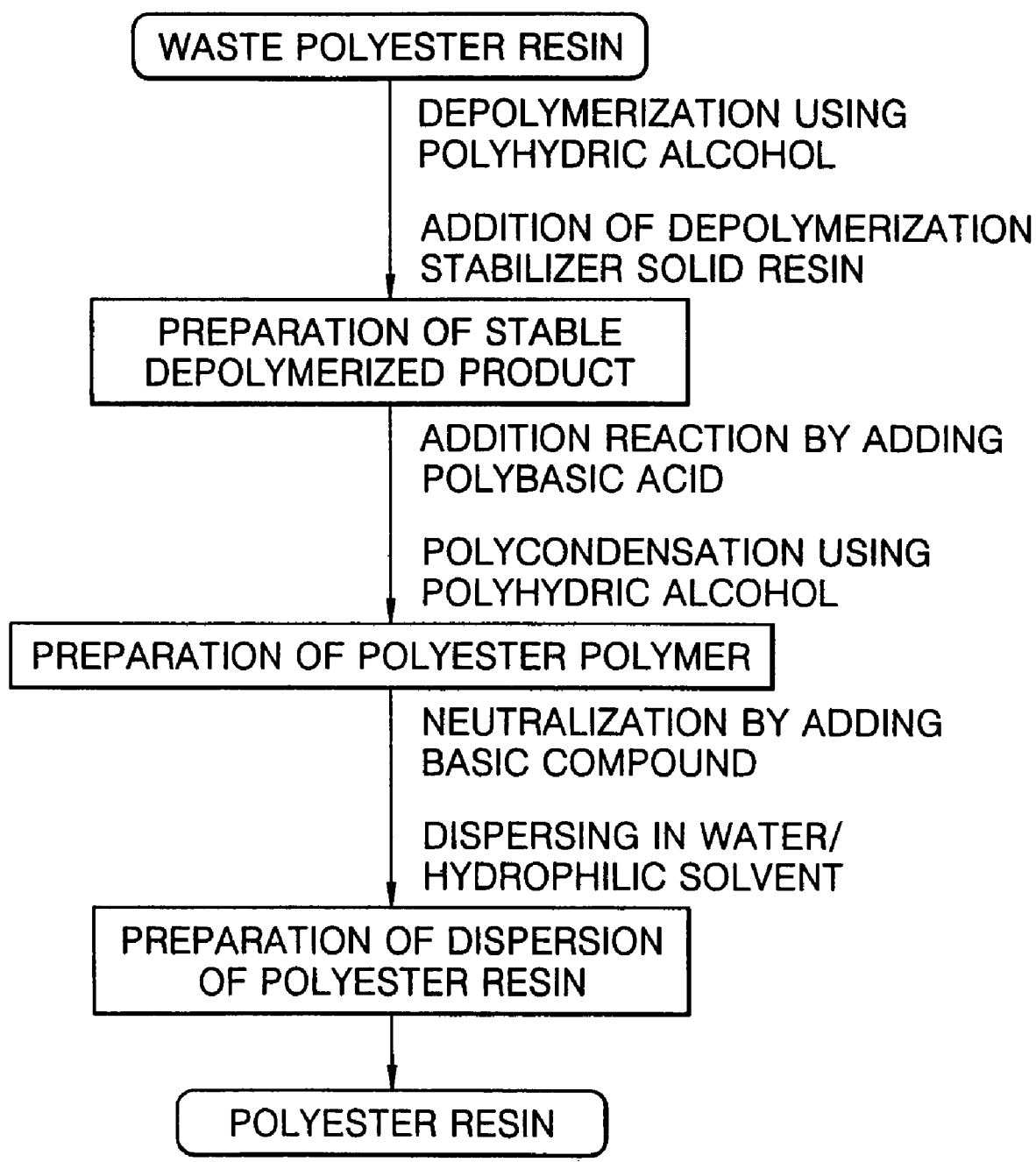
FIG. 2 is a flow chart of a method for recycling waste polyester resins according to another embodiment of the present invention.
Figure 3:
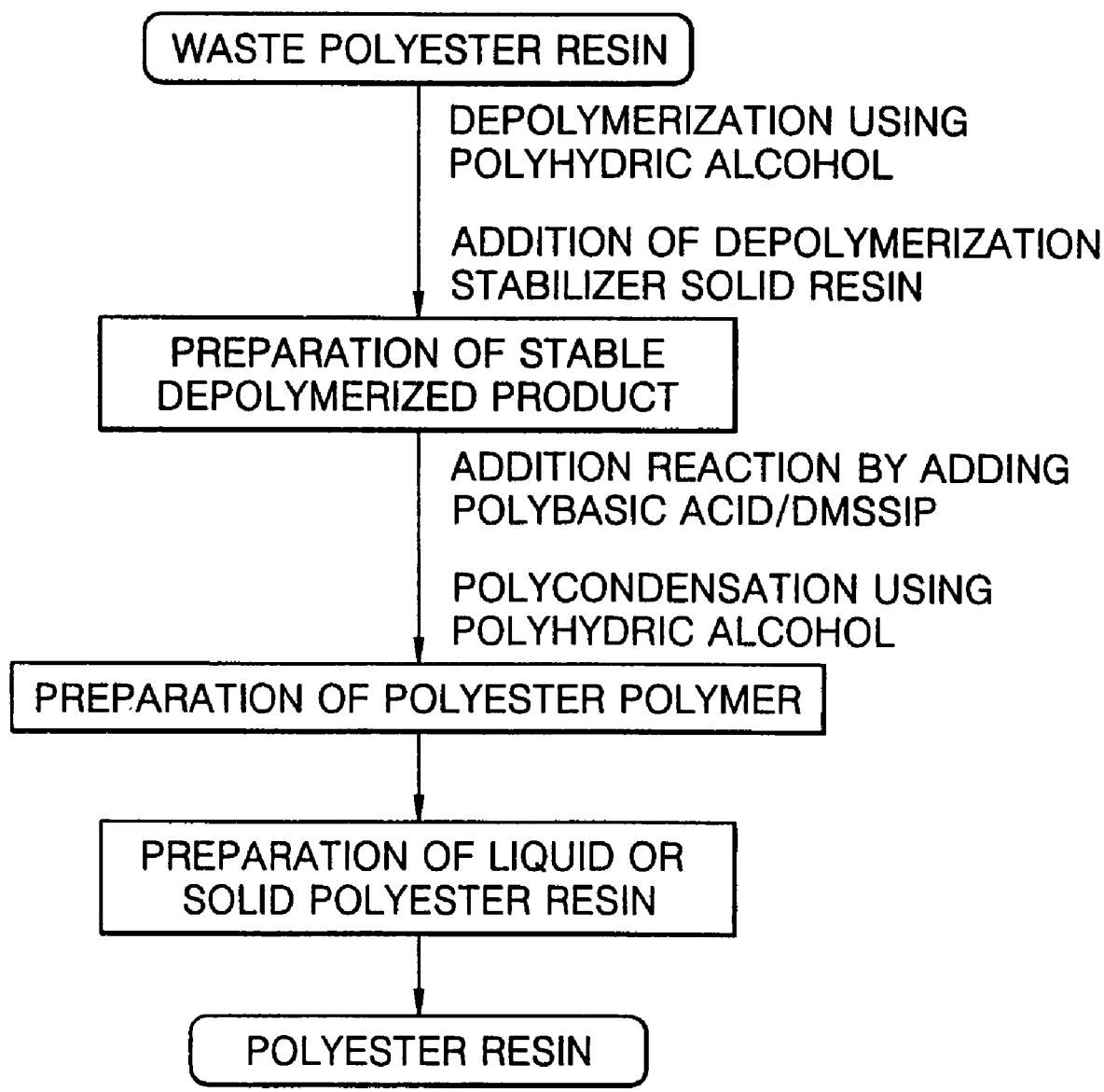
FIG. 3 is a flow chart of a method for recycling waste polyester resins according to still another embodiment of the present invention.
Figure 4:
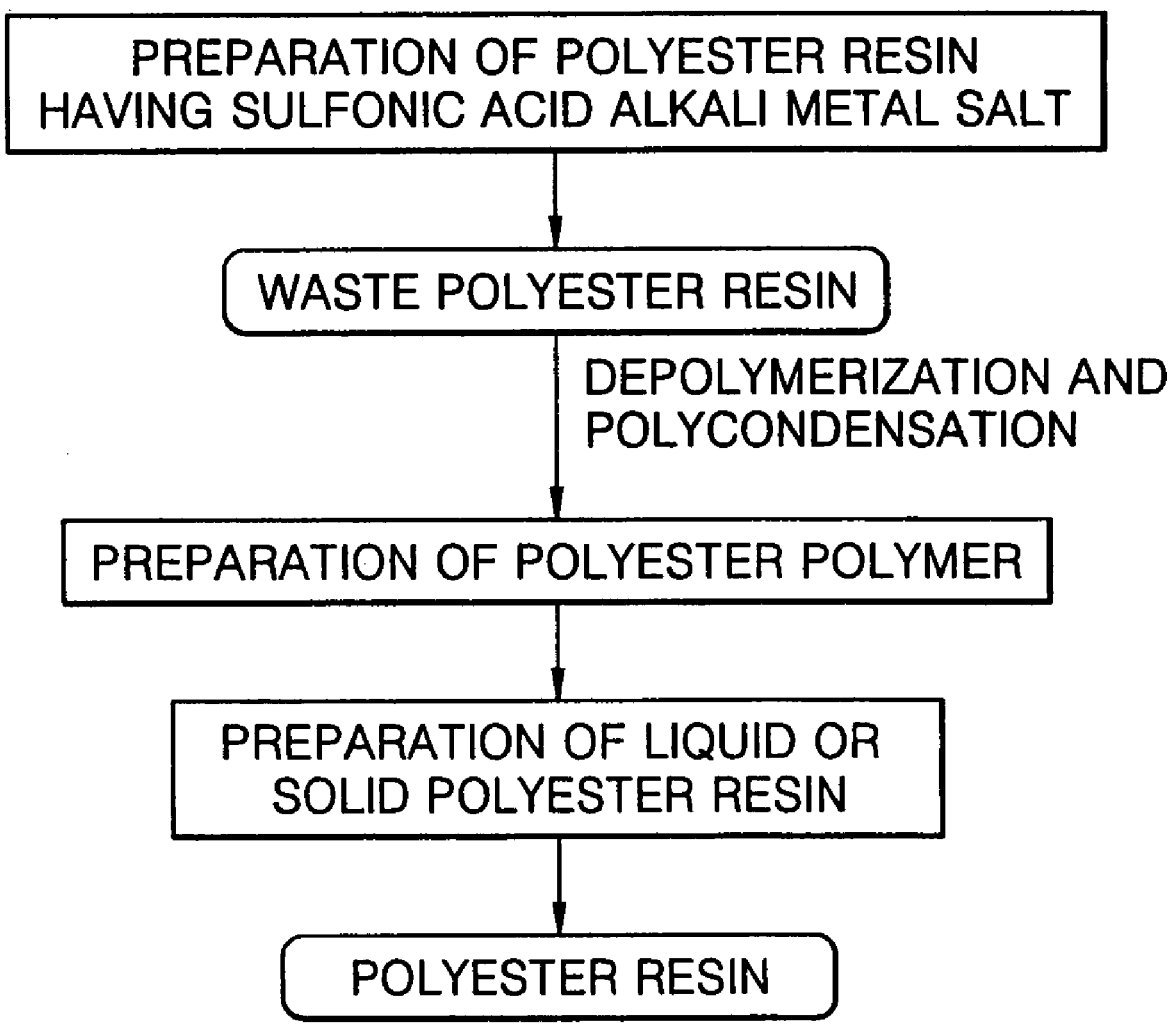
FIG. 4 is a flow chart of a method for recycling waste polyester resins according to still another embodiment of the present invention.

FIGS. 2–4 are flow charts of methods for recycling waste polyester resins according to other embodiments of the present invention. The following Examples are being provided to further illustrate various species of the present invention.

EXAMPLE 5

As shown in FIG. 2, a composition of reclaimed polyester resin in accordance with another embodiment of the present invention is produced through the phases comprising:

(a) reacting waste polyester resin with a polyhydric alcohol to depolymerize the waste polyester resin, removing excess polyhydric alcohol under reduced pressure, and reacting the reaction product with a depolymerization stabilizer solid resin to provide a stable depolymerized product;

(b) addition-reacting the depolymerized product from step (a) with a polybasic acid and polycondensing the reaction product with a polyhydric alcohol to provide a polyester polymer having two or three carboxylic groups at its chain end and having an acid value of 10~150 mgKOH/g; and (c) reacting the polyester polymer with a basic compound to provide a neutralized polyester polymer and dispersing the neutralized polyester polymer in water, a hydrophilic solvent, or a mixture thereof to provide a dispersion of the polyester polymer.

As the depolymerization stabilizer solid resin to be used in the step (a), one or more materials can be selected from the group of rosin, rosin derivatives, hydrogenated rosin, rosin ester, dehydrogenated rosin,maleic rosin, dammar resin, copal resin, petroleum resins, and derivatives of petroleum resins. The amount of the depolymerization stabilizer solid resin to be used is 10~100% by weight of the depolymerized product. The polyhydric alcohol and polybasic acid to be used in the step (b) and the basic compound to be used in the step (c) are the same with the materials used at the making method of the present invention. The hydrophilic solvent to be used in the step (c) can be selected from the group of alcohols, acetone, diacetone alcohol, dimethyl formamide, dimethyl acetamide, ethyl cellosolve, butyl cellosolve, tetrahydrofuran, and N-methyl-2-pyrrolidone. The amount of the hydrophilic solvent to be used is 10~100% by weight of the polyester polymer from the step (b).

The resultant polyester resin is either a liquid or a solid state, and has a flow beginning temperature ($T_{fb}$) of 80~105° C., a flow ending temperature ($T_{end}$) of 120~160° C., and a glass transition temperature($T_g$) of 40~80° C.

EXAMPLE 6

As shown in FIG. 3, a composition of reclaimed polyester resin in accordance with another embodiment of the present invention is produced through the phases comprising:

(a) reacting waste polyester resin with a polyhydric alcohol to depolymerize the waste polyester resin, removing excess polyhydric alcohol under reduced pressure, and reacting the reaction product with a depolymerization stabilizer solid resin to provide a stable depolymerized product;

(b) polycondensing the depolymerized product from step (a) with a polybasic acid, DMSSIP(dimethyl-5-sulfoisophthalate sodium salt), or a mixture thereof and adding a polyhydric alcohol for use in adjusting acid value into the polycondensed product to provide a polyester polymer; and (c) recovering the polyester polymer in liquid or solid form, wherein the polyester polymer recovered in liquid form is dissolved in water, a hydrophilic solvent, or a mixture thereof.

The depolymerization stabilizer solid resin in the step (a), the polyhydric alcohol and the polybasic acid in the step (b), and the basic compound and the hydrophilic solvent in the step (c) are the same with the materials used at the making method of the present invention. In addition, when the DMSSIP is mixed with the polybasic acid, the amount of DMSSIP to be used is 1–30% by weight of the total amount of the polybasic acid.

The resultant polyester resin is either a liquid or a solid state, and has a flow beginning temperature ($T_{fb}$) of 80~105° C., a flow ending temperature ($T_{end}$) of 120~160° C., and a glass transition temperature ($T_g$) of 40~80° C.

EXAMPLE 7

As shown in FIG. 4, a composition of reclaimed polyester resin in accordance with another embodiment of the present invention. is produced through the phases comprising.

(a) preparing a polyester resin having a residue of an sulfonic acid alkali metal salt of aromatic dicarboxylic acid including DMSSIP(dimethyl-5-sulfoisophthalate sodium salt);

(b) reacting the polyester resin from step (a) with waste polyester resin to depolymerize the waste polyester resin and polycondensing the reaction product to provide a polyester polymer, wherein the polycondensation is accompanied by ester interchange reaction; and (c) recovering the polyester polymer in liquid or solid form, wherein the polyester polymer recovered in liquid form is dissolved in water, a hydrophilic solvent, or a mixture thereof.

The DMSSIP in the step (a) is one of sulfonic acid alkali metal salts of aromatic dicarboxylic acids and functions as a compound causing depolymerization. The mixture of the DMSSIP and a polybasic acid can be used instead of DMSSIP. Here, the amount of the mixture to be used is the same with Example 6.

The resultant polyester resin is either a liquid or a solid state, and has a flow beginning temperature ($T_{fb}$) of 80~105° C., a flow ending temperature ($T_{end}$) of 120~160° C., and a glass transition temperature ($T_g$) of 40~80° C.

INDUSTRIAL APPLICABILITY

The reclaimed polyester resin according to the present invention has the excellent compatibility, dispersibility, and adhesive property for various media, and can be easily neutralized and dissolved in water. Accordingly, the polyester resin can be used as a useful material for industrial products such as a developer for electrophotograph, ink-jet inks, a textile finishing agent, an adhesive, a binder of film coatings, a toner, a hotmelt adhesive, and a binder of powder coating.

What is claimed is:

1. A method for recycling waste polyester resin, the method comprising:
   (b) depolymerizing waste polyester resin;
   (b) polycondensing the depolymerized product from step (a) with a polyhydric alcohol to provide a polyester polymer having an acid value of 10–150 mgKOH/g; and
   (c) recovering the polyester polymer in solid or liquid form if the polyester polymer from step (b) has an acid value of more than 20 mgKOH/g or recovering the polyester polymer in solid form if the polyester polymer from step (b) has an acid value of less than 20 mgkOH/g.

2. The method of claim 1, wherein step (a) comprises:
   (a1) reacting the waste polyester resin with a solid resin dissolvent for primary depolymerization; and
   (a2) reacting the depolymerized product from step (a1) with a polybasic acid for secondary depolymerization and an addition reaction.

3. The method of claim 2, wherein the solid resin dissolvent is at least one selected from the group consisting of gum rosin, wood rosin, dehydrogenated rosin, hydrogenated rosin, maleic rosin, rosin ester, pinene resin, dipentene resin, C5 petroleum resins, C9 petroleum resins, dammar resin, copal resin, dicyclopentadiene resin, hydrogenerated dicyclopentadiene resin, and styrene maleic resin.

4. The method of claim 2, wherein the weight ratio of the waste polyester resin to the solid resin dissolvent is in the range of 1:9~9:1.

5. The method of claim 2, wherein the polybasic acid is at least one selected from the group consisting of phthalic anhydride, isophthalic acid, terephthalic acid, adipic acid, azelaic acid, sebacic acid, tetrahydrophthalic anhydride, maleic anhydride, fumaric acid, itaconic acid, trimellitic acid, trimellitic anhydride, pyromellitic anhydride, succinic acid, cyclohexane dicarboxylic acid, and naphthalene dicarboxylic acid.

6. The method of claim 2, wherein the amount of the polybasic acid is in the range of 10~70% by weight of the weight of the depolymerized product from step (a1).

7. The method of claim 1, wherein steps (a) and (b) are carried out in the presence of depolymerization and polycondensation catalysts in an amount of 0.05~0.5% by weight of the reactant.

8. The method of claim 1, wherein steps (a) and (b) are carried out at a temperature of 200~250° C.

9. The method of claim 1, wherein the polyhydric alcohol in step (b) is at least one selected from the group consisting of ethylene glycol, propylene glycol, 1,3-propanediol, 1,3-butanediol, 1,6-hexanediol, neopentyl glycol, diethylene glycol, dipropylene glycol, polyethylene glycol, an alkylene oxide adduct of bisphenol A, trimethylol propane, glycerin, and pentaerythritol.

10. The method of claim 1, wherein the amount of the polyhydric alcohol in step (b) is in the range of 10~70% by weight of the depolymerized product from step (a).

11. The method of claim 1, wherein the polyester polymer in step (b) has a weight average molecular weight of 3,000~50,000.

12. The method of claim 1, wherein the polyester polymer in step (b) has a softening point of 70~150° C.

13. The method of claim 1, wherein step (c) of recovering the polyester polymer in liquid form comprises:
   (c1) reacting the polyester polymer from step (b) with a basic compound in order to obtain a neutralized polyester polymer; and
   (c2) dissolving the neutralized polyester polymer from step (c1) in water, a hydrophilic solvent, or a mixture thereof.

14. The method of claim 13, wherein the basic compound is at least one selected from the group consisting of sodium hydroxide, potassium hydroxide, ammonium hydroxide, lithium hydroxide, and amines.

15. The method of claim 13, wherein the amount of the basic compound is in the range of 3~30% by weight of the polyester polymer from step (b).

16. The method of claim 13, wherein the hydrophilic solvent is at least one selected from the group consisting of alcohols, ethers, acetone, diacetone alcohol, dimethyl formamide, dimethyl acetamide tetrahydrofuran, ethylene glycol, propylene glycol, butylene glycol, and N-methyl-2-pyrrolidone.

17. The method of claim 13, wherein the amount of water, the hydrophilic solvent, or the mixture thereof is in the range of 1~10 times the weight of the neutralized polyester polymer.

18. A method for recycling waste polyester resin, the method comprising:
   (a) reacting waste polyester resin with a polyhydric alcohol to depolymerize the waste polyester resin, removing excess polyhydric alcohol under reduced pressure, and reacting the reaction product with a depolymerization stabilizer solid resin to provide a stable depolymerized product;

(b) addition-reacting the depolymerized product from step (a) with a polybasic acid and polycondensing the reaction product with a polyhydric alcohol to provide a polyester polymer having two or three carboxylic groups at its chain end and having an acid value of 10~150 mgKOH/g; and (c) reacting the polyester polymer with a basic compound to provide a neutralized polyester polymer and dispersing the neutralized polyester polymer in water, a hydrophilic solvent, or a mixture thereof to provide a dispersion of the polyester polymer.

19. The method of claim 18, wherein the basic compound is at least one selected from the group consisting of sodium hydroxide, potassium hydroxide, ammonium hydroxide, lithium hydroxide, and amines.

20. The method of claim 18, wherein the amount of the basic compound is in the range of 3~30% by weight of the polyester polymer from step (b).

21. A method for recycling waste polyester resin, the method comprising:

(a) reacting waste polyester resin with a polyhydric alcohol to depolymerize the waste polyester resin, removing excess polyhydric alcohol under reduced pressure, and reacting the reaction product with a depolymerization stabilizer solid resin to provide a stable depolymerized product;

(b) polycondensing the depolymerized product from step (a) with a polybasic acid, DMSSIP, or a mixture thereof and adding a polyhydric alcohol for use in adjusting acid value into the polycondensed product to provide a polyester polymer; and (c) recovering the polyester polymer in liquid or solid form, wherein the polyester polymer recovered in liquid form is dissolved in water, a hydrophilic solvent, or a mixture thereof.

22. The method of claim 18 or 21, wherein the depolymerization stabilizer solid resin is at least one selected from the group consisting of rosin and derivatives thereof, hydrogenated rosin, rosin ester, dehydrogenated rosin, maleic rosin, dammar resin, copal resin, petroleum resin and derivatives thereof.

23. The method of claim 18 or 21, wherein the amount of the depolymerization stabilizer solid resin is in the range of 10~100% by weight of the depolymerized product.

24. The method of claim 18 or 21, wherein the polyhydric alcohol is at least one selected from the group consisting of ethylene glycol, propylene glycol, 1,3-propanediol, 1,3-butanediol, 1,6-hexanediol, neopentyl glycol, diethylene glycol, dipropylene glycol, polyethylene glycol, an alkylene oxide adduct of bisphenol A, trimethylol propane, glycerin, and pentaerythritol.

25. The method of claim 18 or 21, wherein the polybasic acid is at least one selected from the group consisting of phthalic anhydride, isophthalic acid, terephthalic acid, adipic acid, azelaic acid, sebacic acid, tetrahydrophthalic anhydride, maleic anhydride, fumaric acid, itaconic acid, trimellitic acid, trimellitic anhydride, pyromellitic anhydride, succinic acid, cyclohexane dicarboxylic acid, and naphthalene dicarboxylic acid.

26. The method of claim 18 or 21, wherein the amount of the polybasic acid is in the range of 10~50% by weight of the depolymerized product from step (a).

27. A method for recycling waste polyester resin, the method comprising:

(a) preparing a polyester resin having a residue of an sulfonic acid alkali metal salt of aromatic dicarboxylic acid including DMSSIP;

(b) reacting the polyester resin from step (a) with waste polyester resin to depolymerize the waste polyester resin and polycondensing the reaction product to provide a polyester polymer, wherein the polycondensation is accompanied by ester interchange reaction; and (c) recovering the polyester polymer in liquid or solid form, wherein the polyester polymer recovered in liquid form is dissolved in water, a hydrophilic solvent, or a mixture thereof.

28. The method of claim 21 or 27, wherein the amount of DMSSIP is in the range of 1~30% by weight of a polybasic acid when used along with the polybasic acid.

29. The method of claim 18, 21, or 27, wherein the hydrophilic solvent is at least one selected from the group consisting of alcohols, acetone, diacetone alcohol, dimethyl formamide, dimethyl acetamide, ethylcellosolve, butylcellosolve, tetrahydrofuran, and N-methyl-2-pyrrolidone.

30. The method of claim 18, 21, or 27, wherein the amount of the hydrophilic solvent is in the range of 10~100% by weight of the polyester polymer from step (b).

31. A polyester resin in solid or liquid form recovered by the method of any one of claims 1, 18, 21, or 27.

32. The polyester resin of claim 31, having a flow beginning temperature $T_{fb}$ of 80~105° C.

33. The polyester resin of claim 31, having a flow end temperature $T_{end}$ of 120~160° C.

34. The polyester resin of claim 31, having a glass transition temperature $T_g$ of 40~80° C.

35. The polyester resin of claim 31, being used as one of a developer for electrophotography, ink-jet ink, a textile finishing agent, an adhesive, a film coating binder, a toner, a hotmelt adhesive, and a powder coating binder.

* * * * *